(12) United States Patent
Takano

(10) Patent No.: US 10,296,461 B2
(45) Date of Patent: May 21, 2019

(54) STORAGE DEVICE AND DATA SAVING METHOD

(71) Applicant: TOSHIBA MEMORY CORPORATION, Minato-ku (JP)

(72) Inventor: Takayuki Takano, Yokohama (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 234 days.

(21) Appl. No.: 15/061,433

(22) Filed: Mar. 4, 2016

(65) Prior Publication Data

US 2017/0038973 A1 Feb. 9, 2017

(30) Foreign Application Priority Data

Aug. 6, 2015 (JP) ................... 2015-155917

(51) Int. Cl.
G06F 12/00 (2006.01)
G06F 12/0868 (2016.01)
G06F 1/3203 (2019.01)
G06F 1/3287 (2019.01)
G06F 3/06 (2006.01)

(52) U.S. Cl.
CPC ........ *G06F 12/0868* (2013.01); *G06F 1/3203* (2013.01); *G06F 1/3287* (2013.01); *G06F 3/0625* (2013.01); *G06F 3/0655* (2013.01); *G06F 3/0656* (2013.01); *G06F 3/0679* (2013.01); *G06F 2212/1052* (2013.01); *G06F 2212/202* (2013.01); *G06F 2212/22* (2013.01); *G06F 2212/402* (2013.01); *Y02D 10/13* (2018.01)

(58) Field of Classification Search
None
See application file for complete search history.

(56) References Cited

U.S. PATENT DOCUMENTS 5,345,347 A * 9/1994 Hopkins ............... G06F 1/3215
360/71
2002/0085631 A1* 7/2002 Engwer .................... H04B 1/66
375/240

(Continued)

FOREIGN PATENT DOCUMENTS

JP 2008-139908 A 6/2008
JP 2008-165573 A 7/2008

(Continued)

*Primary Examiner* — Reginald G Bragdon
*Assistant Examiner* — Michael L Westbrook
(74) *Attorney, Agent, or Firm* — Oblon, McClelland, Maier & Neustadt, L.L.P.

(57) ABSTRACT

According to one embodiment, a storage device includes a first nonvolatile memory, a second volatile memory, and a controller. In the second volatile memory, at least one of management information for managing user data written in the first nonvolatile memory and the user data is temporarily written as cache data. The controller is configured to execute processing for writing the cache data written in the second volatile memory to a third memory of the host device, if the storage device is changed from a regular mode to a low power consumption mode in which supplying of power to the second volatile memory is stopped, in response to a request from a host device.

16 Claims, 5 Drawing Sheets

(56) References Cited

U.S. PATENT DOCUMENTS

| | | | |
|---|---|---|---|
| 2009/0327602 A1* | 12/2009 | Moore | G06F 3/0616 |
| | | | 711/114 |
| 2011/0055462 A1 | 3/2011 | Hatsuda et al. | |
| 2013/0166819 A1* | 6/2013 | Yerushalmi | G06F 3/0625 |
| | | | 711/103 |
| 2014/0068157 A1 | 3/2014 | Makuni et al. | |
| 2014/0068281 A1* | 3/2014 | Diamant | G06F 1/3268 |
| | | | 713/300 |
| 2014/0101370 A1* | 4/2014 | Chu | G06F 12/06 |
| | | | 711/103 |
| 2014/0173188 A1 | 6/2014 | Sakamoto | |
| 2014/0181327 A1* | 6/2014 | Cohen | G06F 3/0679 |
| | | | 710/5 |
| 2015/0074330 A1 | 3/2015 | Sawamura et al. | |
| 2015/0160711 A1* | 6/2015 | Zhu | H04W 52/0254 |
| | | | 713/323 |
| 2015/0178009 A1* | 6/2015 | Shin | G06F 12/0246 |
| | | | 711/103 |

FOREIGN PATENT DOCUMENTS

| | | |
|---|---|---|
| JP | 2008-192028 A | 8/2008 |
| JP | 2011-48755 | 3/2011 |
| JP | 2012-58840 A | 3/2012 |
| JP | 2012-203557 | 10/2012 |
| JP | 2014-48679 | 3/2014 |
| WO | WO 2015/015611 A1 | 2/2015 |

\* cited by examiner

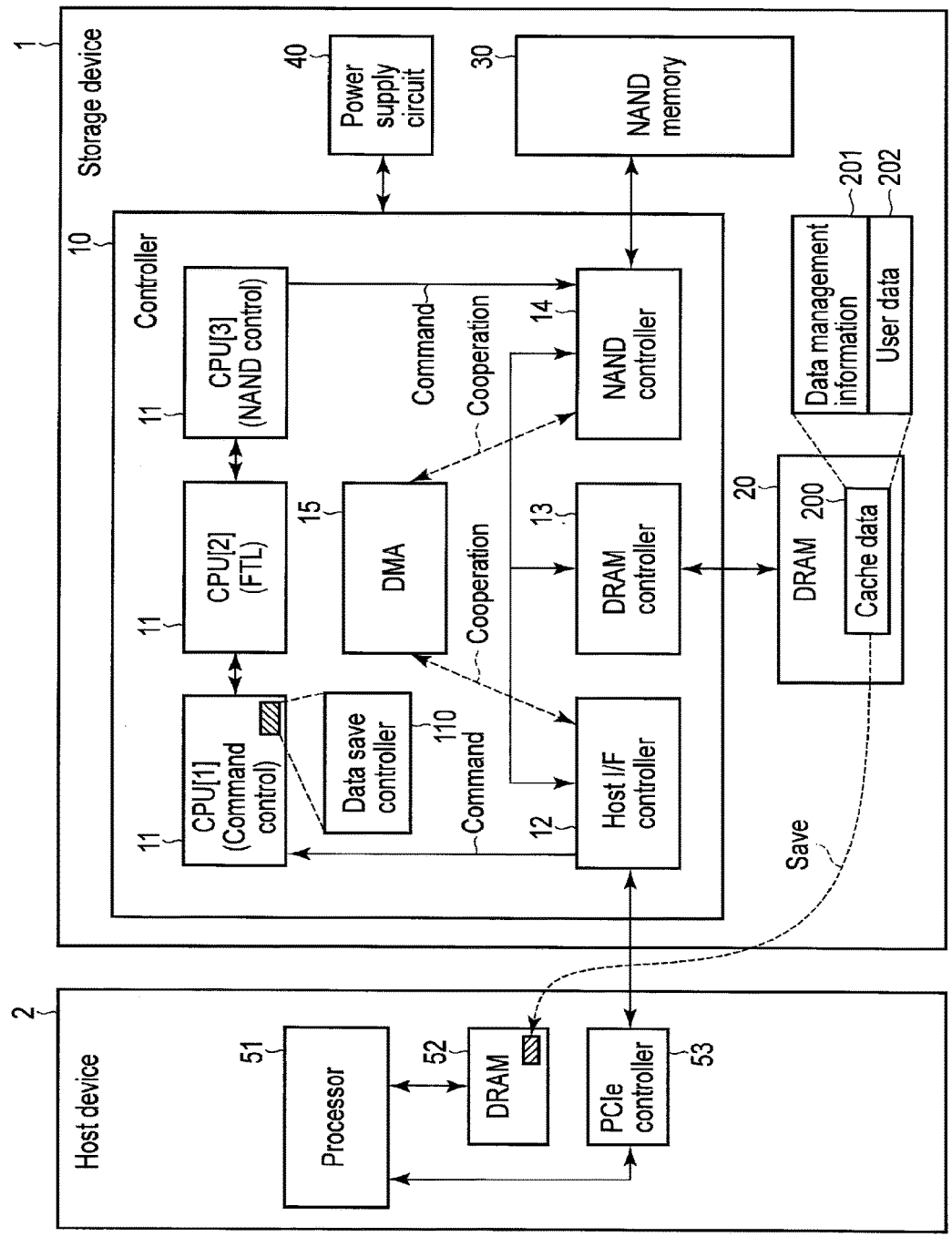
F I G. 1

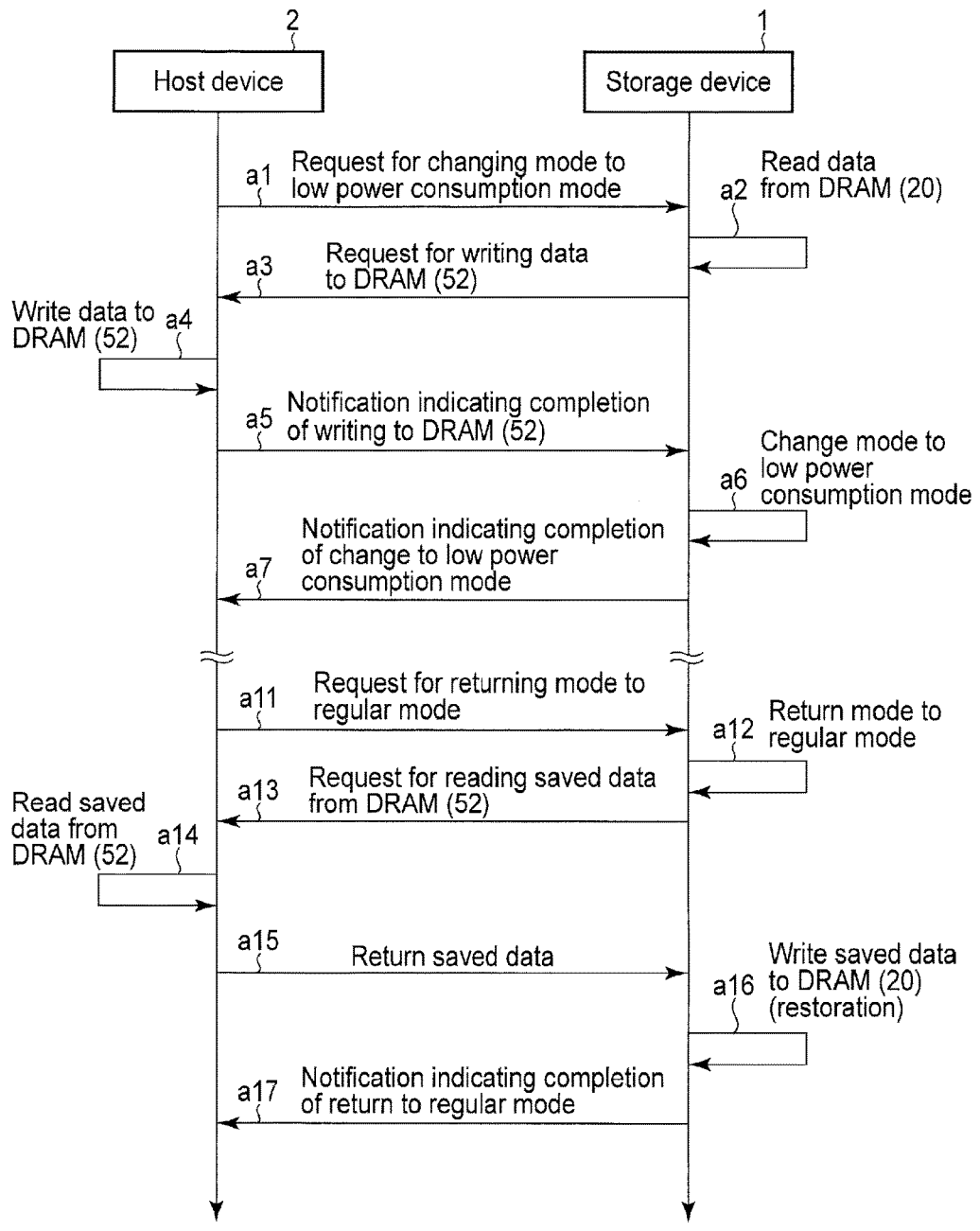
F I G. 2

STORAGE DEVICE AND DATA SAVING METHOD

CROSS-REFERENCE TO RELATED APPLICATIONS

This application is based upon and claims the benefit of priority from Japanese Patent Application No. 2015-155917, filed Aug. 6, 2015, the entire contents of which are incorporated herein by reference.

FIELD

Embodiments described herein relate generally to a storage device and a data saving method.

BACKGROUND

In recent years, storage devices incorporating nonvolatile memories such as solid-state drives (SSDs) have become widespread. An SSD is a storage device to which a NAND memory (flash memory) is applied, and is advantageous since it has a high performance and its power consumption is low. Thus, personal computers (PCs), servers, etc., now tend to employ SSDs as main storage in place of hard disk drives (HDDs).

BRIEF DESCRIPTION OF THE DRAWINGS

FIG. 1 is a block diagram showing a configuration example of a computer system including a storage device according to an embodiment.

FIG. 2 is a sequence chart for explaining an outline of an operation of the storage device according to the embodiment for saving data in a DRAM of a host device.

DETAILED DESCRIPTION

Figure 3:
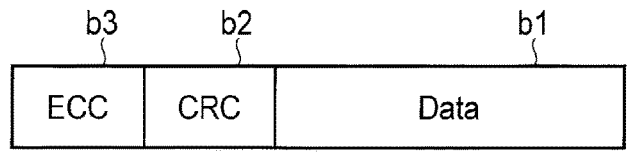
FIG. 3 is a view for explaining data protection using ECC and CRC.

In general, according to one embodiment, a storage device includes a first nonvolatile memory, a second volatile memory, and a controller. In the second volatile memory, at least one of management information for managing user data written in the first nonvolatile memory and the user data is temporarily written as cache data. The controller is configured to execute processing for writing the cache data written in the second volatile memory to a third memory of the host device, if the storage device is changed from a regular mode to a low power consumption mode in which supplying of power to the second volatile memory is stopped, in response to a request from a host device.

FIG. 1 is a block diagram showing a configuration example of a computer system including the storage device according to the embodiment. As shown in FIG. 1, the computer system consists of a storage device 1 which is the storage device according to the embodiment and a host device 2. The host device 2 is a computer such as a PC or a server. The storage device 1 is an SSD which is used as, for example, a main storage for the host device 2. The storage device 1 and the host device 2 are connected to each other by an interface conforming to PCI Express (PCIe) standards, for example. In the following, suppose PCIe is applied. However, another interface standard such as Serial Attached SCSI (SAS) or Serial Advanced Technology Attachment (SATA) may be applied. The storage device 1 is not limited to a storage device incorporated in the host device 2; that is, it may be connected to the host device 2 as an external storage device.

The storage device 1 comprises a controller 10, a DRAM 20, a NAND memory 30 and a power supply circuit 40. Although it is not shown in FIG. 1, the storage device 1 may further comprise an SRAM.

The controller 10 is a processing circuit which receives a write/read request from the host device 2; and using the DRAM 20 as a cache memory, writes data (user data) transmitted from the host device 2 to the NAND memory 30, or reads data requested by the host device 2 from the NAND memory 30. As cache data 200 to be written in the DRAM 20, not only user data 202, but also data management information 201 is present, the data management information 201 being provided as information for managing the correspondence between a logical block address (LBA) space to be recognized by the host device 2 and a physical storage position on the NAND memory 30.

Furthermore, the controller 10 has a function of allowing or stopping the supply of power from the power supply circuit 40 to the DRAM 20 and the NAND memory 30, in accordance with a request from the host device 2. For example, when requested by the host device 2 to effect switching to a low power consumption mode, the controller 10 stops supply of power from the power supply circuit 40 to the DRAM 20 and the NAND memory 30. In the following, suppose as the state of the storage device 1 in the low power consumption mode, the DRAM 20 and the NAND memory 30 are powered down. However, the state is not limited to such a state; that is, for example, the entire function of the controller 10 or part thereof may be made off. In the low power consumption mode, at least the DRAM 20 is powered down.

The controller 10 includes a plurality of central processing units (CPUs) 11, a host interface (I/F) controller 12, a DRAM controller 13, a NAND controller 14 and a direct memory access (DMA) 15.

The CPUs 11 are a group of processors provided to separately execute various processes for operating the storage device 1 in response to a request from the host device 2, for example, a command control, a flash translation layer (FTL) process, a NAND control, etc. By at least one of the CPUs 11, the function of a data save controller 110 to be described later is achieved. The function of the data save controller 110 may be achieved by a processing circuit (hardware) or firmware which is installed in, for example, the NAND memory 30 or another nonvolatile memory not shown in FIG. 1.

The host interface controller 12 performs communication with the host device 2. The DRAM controller 13 executes data write/read processing to/from the DRAM 20. The NAND controller 14 executes data read/write processing to/from the NAND memory 30. The DMA 15 controls data transmission between the host interface controller 12 and the DRAM controller 13 and that between the DRAM controller 13 and the NAND controller 14.

On the other hand, the host device 2 comprises a processor 51, a DRAM 52 and a PCIe controller 53 (as structural elements related to the storage device 1). The processor 51 controls operations of various components in the host device 2. The DRAM 52 is a storage device which is used as a main memory of the host device 2. The PCIe controller 53 performs communication with the storage device 1, and to be more specific, it performs communication with the host interface controller 12.

The host device 2 has various power saving functions; and for example, it requests the storage device 1 to shift the low power consumption mode, if the access to the storage device 1 is stopped for a given time or more. Also, the host device 2 requests the storage device 1 to shift the low power consumption mode, in the case where it shifts a sleep state.

As described above, when the storage device 1 is in the low power consumption mode, supply of power to the DRAM 20 is stopped. Therefore, if the storage device 1 is requested by the host device 2 to shift the low power consumption mode, it needs to save cache data 200 written in the DRAM 20. In general, cache data 200 is saved in the NAND memory 30. In view of the characteristics of the NAND memory 30, in the storage device 1 which is frequently requested to shift the low power consumption mode, it is necessary to take a countermeasure in consideration of how data should be easily saved and restored.

In view of the above, the storage device 1 according to the embodiment is set such that when it shifts the low power consumption mode, the cache data 200 written in the DRAM 20 is saved in the DRAM 52 of the host device 2. The storage device 1 can access the DRAM 52 of the host device 2 in a procedure conforming to unified memory extension (UME) standards applied as an option function of universal flash storage (UFS) standards. The data save controller 110 is a processor for saving data in the DRAM 52 of the host device 2, and this processing will be explained in detail.

It should be noted that the following explanation is given by referring to by way of example the case where as the timing at which cache data 200 written in the DRAM 20 is saved in the DRAM 52 of the host device 2, the timing at which the mode is changed to the low power consumption mode is applied. However, the timing is not limited to such timing. Needless to say, various timings can be applied. For example, it may be set that the above data saving is carried out each time a given amount of data is updated, and when the supply of power is suddenly stopped, data saving is carried out within a possible range.

Also, as described above, the storage device 1 may further comprise an SRAM. If it comprises an SRAM, not only the cache data 200 written in the DRAM 20, but also data written in the SRAM may be handled as data to be saved.

FIG. 2 is a sequence chart for explaining an outline of an operation of the data save controller 110 for saving data in the DRAM 52 of the host device 2. It should be noted that the data save controller 110 may have a function of setting whether to save the cache data 200 written in the DRAM 20 in the NAND memory 30 (in the storage device 1) or in the DRAM 52 of the host device 2. If a storage device accessible from the storage device 1 is further present in the host device 2 in addition to the DRAM 52, one of a plurality of storage devices (including the DRAM 52) in the host device 2 may be set as a storage device in which the cache data 200 is to be saved. In the following, suppose as such a storage device, the DRAM 52 of the host device 2 is set. The above setting of a storage device is not limited to that by the data save controller 110; that is, it may be performed by, for example, the host device 2. Furthermore, the data save controller 110 or the host device 2 may adaptively determine the above setting in accordance with, for example, the free space for storage in the NAND memory 30, the degree of degradation thereof, the size of the cache data 200 or the like.

If the host device 2 makes a request for changing the mode to the low power consumption mode (a1 in FIG. 2), the data save controller 110 first executes reading of the cache data 200 written in the DRAM 20 (a2 in FIG. 2). Then, the data save controller 110 requests the host device 2 to write the cache data 200 read from the DRAM 20, i.e., data to be saved, to the DRAM 52 (a3 in FIG. 3). In this case, the data save controller 110 may determine the importance of each of data items in the cache data 200, and may transmit the data items in descending order of importance to the host device 2. In response to this request, the host device 2 writes data transmitted from the storage device 1, i.e., the cache data 200 to be saved, to the DRAM 52 (a4 in FIG. 2), and then notifies the storage device 1 of completion of writing of the data to the DRAM 52 (a5 in FIG. 2). When receiving this notification, the data save controller 110 causes the storage device 1 to shift the low power consumption mode in which the supply of power from the power supply circuit 40 to the NAND memory 30 and the NAND memory 30 is stopped (a6 in FIG. 2). When the storage device 1 shifts the low power consumption mode, the data save controller 110 notifies the host device 2 that the storage device 1 shifts the low power consumption mode (a7 in FIG. 2).

On the other hand, if the host device 2 makes a request for returning the mode (from the low power consumption mode) to a regular mode (a11 in FIG. 2), the data save controller 110 first returns the mode of the storage device 1 to a regular mode in which power from the power supply circuit 40 is allowed to be supplied to the NAND memory 30 and the NAND memory 30 (a12 in FIG. 2). Then, the data save controller 110 requests the host device 2 to read the saved data from the DRAM 52, i.e., the cache data 200, which was requested to be written at the time of changing the mode to the low power consumption mode (a13 in FIG. 2). In response to this request, the host device 2 executes reading of the saved data (the cache data 200) from the DRAM 52 (a14 in FIG. 2), and returns the read data to the storage device 1 (a15 in FIG. 2). The data save controller 110 writes the saved data to the DRAM 20a, i.e., the cache data 200, which is returned from the host device 2, and restores the DRAM 20 to the state at the time of changing the mode to the low power consumption mode (a16 in FIG. 2). When the DRAM 20 is restored to the state at the time of changing the mode to the low power consumption mode, the data save controller 110 notifies the host device 2 of completion of returning to the regular mode (a17 in FIG. 2).

Instead of in the NAND memory 30, the data is saved in the DRAM 52 of the host device 2, as a result of which the storage device 1 frequently uses the NAND memory 30 in order to write ordinary data (user data), thus reducing the number of times write/erase processing is performed, and restrict the degradation of the NAND memory 30.

Furthermore, as compared with the NAND memory 30, in the DRAM 52 of the host device 2, data is not frequently garbled. Thus, by saving data in the DRAM 52 of the host device 2, the reliability of the saved data is also improved.

It should be noted that since in the DRAM 52 of the host device 2, data is not frequency garbled, the data save controller 110 may be set to omit processing for protecting data with an ECC or a cyclic redundancy check (CRC) and save data in the DRAM 52 of the host device 2. If so, the amount of data to be transferred between the storage device 1 and the host device 2 is reduced, and the time required to change the mode between the regular mode and the low power consumption mode is also reduced. Alternatively, by lowering the degree of data protection, for example, by decreasing the amount of data for ECC, decrease the amount of data to be transferred between the storage device 1 and the host device 2, and reduce the time required to change the mode between the regular mode and the low power consumption mode. FIG. 3 is a view for explaining data protection using ECC and CRC.

In the NAND memory 30, ordinarily, at the time of writing data (b1 in FIG. 3) to the NAND memory 30, a check code (b2 in FIG. 3) is produced from the data, and an error-correcting code (b3 in FIG. 3) is produced from the data and the check code. To the NAND memory 30, the data, the check code and the error-correcting code are written. On the other hand, at the time of reading data from the NAND memory 30, the data, the check code and the error-correcting code are read, and an error in the data, the check code and the error-correcting code is corrected with the error-correcting code, and an error in the data and the check code is detected with the check code.

That is, in the case of saving the cache data 200 written in the DRAM 20 in the NAND memory 30, it is necessary to protect data with the above ECC or CRC. On the other hand, as described above, in the DRAM 52 of the host device 2, data is not frequently garbled, as compared with the NAND memory 30. Thus, in the case of saving the data in the DRAM 52 of the host device 2, data protection using ECC or CRC, which is needed in saving data in the NAND memory 30, is omitted, thus reducing the amount of data to be transmitted between the storage device 1 and the host device 2, and also reducing the time required to change the mode between the regular mode and the low power consumption mode.

Figure 4:
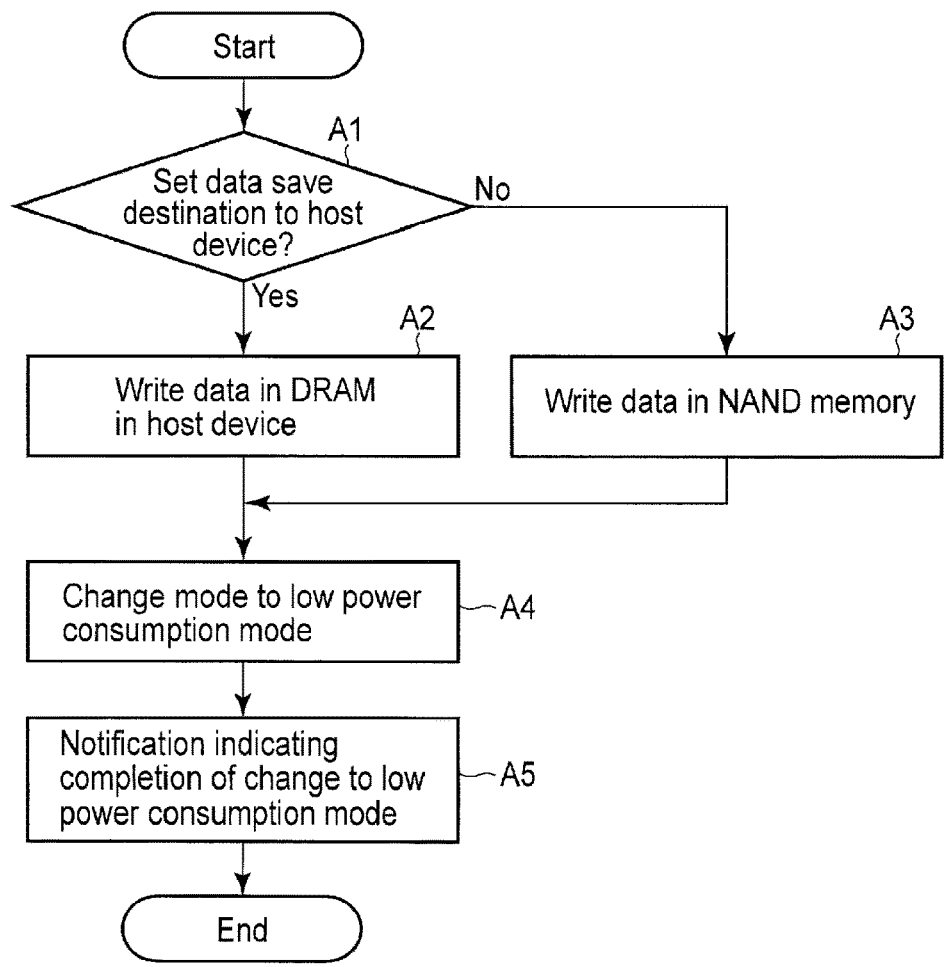
FIG. 4 is a flowchart indicating a processing procedure of saving data in the DRAM of the host device by the storage device according to the embodiment.

FIG. 4 is a flowchart indicating a processing procedure of saving data in the DRAM 52 of the host device 2 by the data save controller 110.

At the time of changing the mode to the low power consumption mode, the data save controller 110 checks whether the cache data 200 written in the DRAM 20 is set to be saved in the NAND memory 30 or in the DRAM 52 of the host device 2 as a save destination (block A1). As described above, the save destination may be set by the data save controller 110 or the host device 2. Furthermore, based on, for example, the free space for storage of the NAND memory 30, the degree of degradation thereof, or the like, the data save controller 110 or the host device 2 may adaptively determine the save destination.

If the DRAM 52 of the host device 2 is set as the save destination (YES in block A1), the data save controller 110 saves the cache data 200 written in the DRAM 20 in the DRAM 52 of the host device 2 (block A2). On the other hand, if the NAND memory 30 is set as the save destination (NO in block A1), the data save controller 110 saves the cache data 200 written in the DRAM 20 in the NAND memory 30 (block A3).

When the data saving is completed, the data save controller 110 changes the mode of the storage device 1 to the low power consumption mode in which supply of power from the power supply circuit 40 to the NAND memory 30 and the NAND memory 30 is stopped (block A4). Then, the data save controller 110 notifies the host device 2 of completion of changing the mode to low power consumption mode (block A5).

In such a manner, in the storage device 1, data is saved in the DRAM 52. This countermeasure enables data to be easily saved and restored.

Next, the following explanation is given with respect to various functions which the data save controller 110 can have in saving data in the DRAM 52 of the host device 2.

Figure 5:
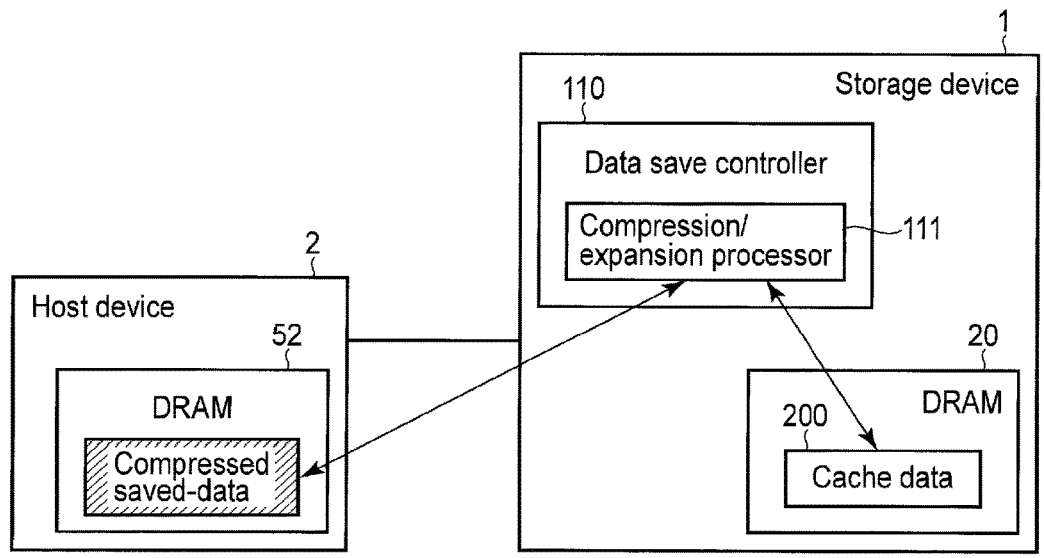
FIG. 5 is a view for explaining a data saving function of the storage device according to the embodiment for compressing data and saving it in the DRAM of the host device.

FIG. 5 is a view for explaining a function of compressing the cache data 200 written in the DRAM 20 and saving it in the DRAM 52 of the host device 2.

If it is expected that the time required to save the data in the DRAM 2 of the host device 2 will be shortened in consideration of the rate at which data is transferred between the storage device 1 and the host device 2 and the processing ability of the storage device 1 (group of CPUs 11), the data save controller 110 may have a function of compressing/expanding data (compression/expansion processor 111). Alternatively, the compression/expansion processor 111 may be set on.

At the time of changing the mode to the low power consumption mode, the data save controller 110 reads the cache data 200 from the DRAM 20, and compresses the read cache data 200 with the compression/expansion processor 111. The data save controller 110 saves the compressed cache data 200 in the DRAM 52 of the host device 2.

At the time of returning the mode (from the low power consumption mode) to the regular mode, the data save controller 110 acquires from the host device 2 the cache data which is compressed and saved in the DRAM 52 of the host device 2, and expands the acquired (compressed) cache data 200 with the compression/expansion processor 111. The data save controller 110 writes the expanded cache data 200 to the DRAM 20, and restores the DRAM 20 to the state thereof at the time of changing the mode to the low power consumption mode.

In such a manner, the data save controller 110, which controls saving of data in the DRAM 52 of the host device, has a function of compressing/expanding data. Thus, if it is possible to absorb the increasing of the processing of the storage device 1 (compression/expansion of the cache data 200), the data save controller 110 can reduce the time required to change the mode between the regular mode and the lower power consumption mode.

Furthermore, the data save controller 110 may compress the cache data 200 if the size of the cache data 200 is greater than or equal to a predetermined threshold value.

Figure 6:
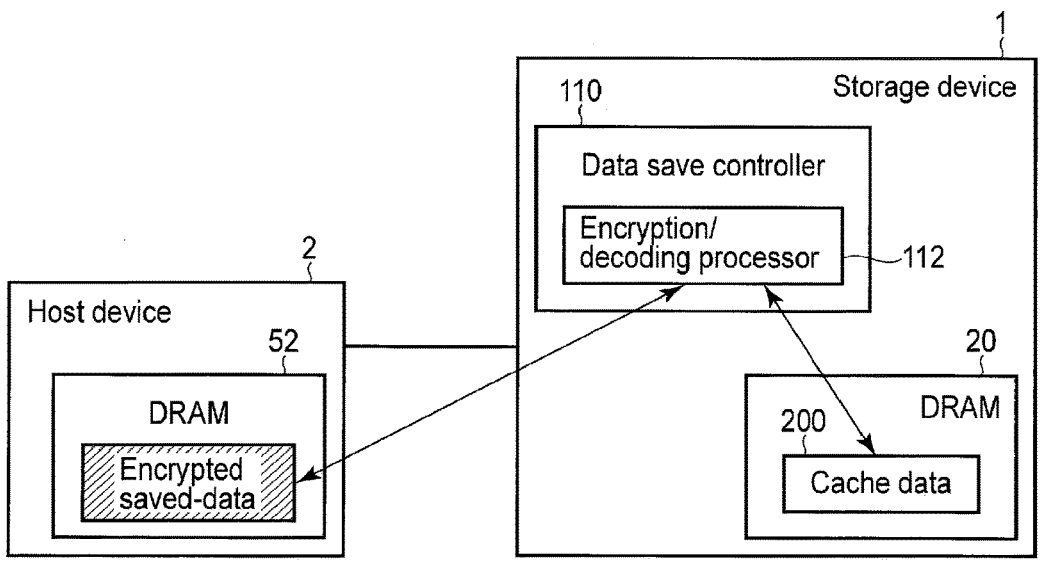
FIG. 6 is a view for explaining a data saving function of the storage device according to the embodiment for encrypting data and saving it in the DRAM of the host device.

FIG. 6 is a view for explaining a function of encrypting the cache data 200 written in the DRAM 20 and saving it in the DRAM 52 of the host device 2.

For example, in view of security protection, the data save controller 110 may have a function of encrypting/decoding data (encryption/decoding processor 112) in the case where it is considered undesired that the cache data 200 including user data 202 is continuously present in the DRAM 52 of the host device 2 for long time. Alternatively, in such a case, the encryption/decoding processor 112 may be set on.

At the time of changing the mode to the low power consumption mode, the data save controller 110 reads the cache data 200 from the DRAM 20, and encrypts the read cache data 200 with the encryption/decoding processor 112. The data save controller 110 saves the encrypted cache data 200 in the DRAM 52 of the host device 2.

At the time of returning the mode (from the low power consumption mode) to the regular mode, the data save controller 110 acquires from the host device 2, the cache data 200 which is encrypted and saved in the DRAM 52 of the host device 2, and decodes the acquired (encrypted) cache data 200. The data save controller 110 writes the decoded cache data 200 to the DRAM 20, and restores the DRAM 20 to the state thereof at the time of changing the mode to the low power consumption mode.

If having a function of encrypting/decoding data, the data save controller 110, which controls saving of data in the DRAM 52 of the host device, can improve the data security.

Although the above explanation refers to by way of example the case where the entire cache data 200 written in the DRAM 20 is saved in the DRAM 52 of the host device 2, it is also possible to save part of the cache data 200 in the DRAM 52 of the host device 2. That is, the cache data 200 may be divided and saved in the DRAM 52 of the host device 2 and the NAND memory 30.

Figure 7:
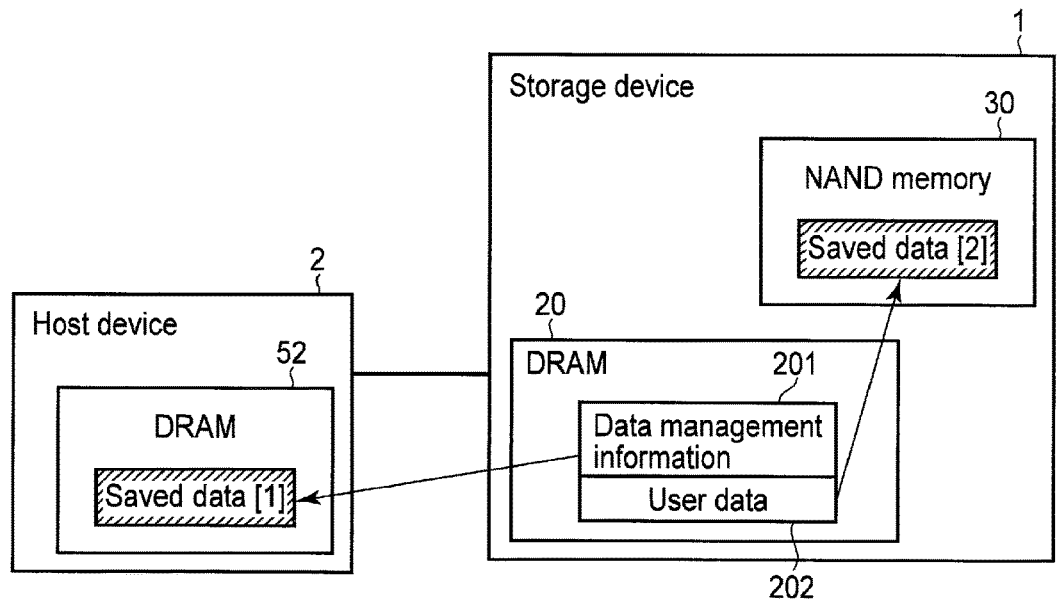
FIG. 7 is a view (first pattern) for explaining a data saving function of the storage device according to the embodiment for dividedly saving data in a NAND memory and the DRAM of the host device.

In view of the security protection, the data save controller 110 may save only the data management information 201 of the cache data 200 in the DRAM 52 of the host device 2, and save the user data 202 of the cache data 200 in the NAND memory 30, as shown in FIG. 7, for example, in the case where it is considered undesired that the cache data 200 including user data 202 is continuously present in the DRAM 52 of the host device 2 for long time.

Figure 8:
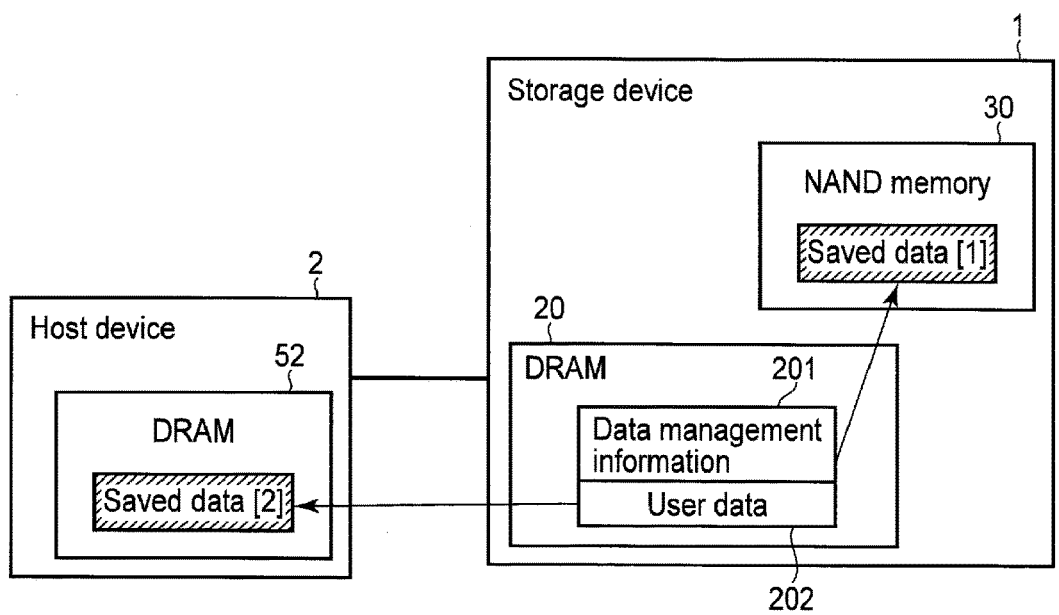
FIG. 8 is a view (second pattern) for explaining a data saving function of the storage device according to the embodiment for dividedly saving data in the NAND memory and the DRAM of the host device.

Conversely, the data save controller 110 may save the data management information 201 of the cache data 200 in the NAND memory 30, and save only the user data 202 of the cache data 200 in the DRAM 52 of the host device 2, as shown in FIG. 8, for example, in the case where the mode is required to be changed form the low power consumption mode to the regular mode for a shorter time period, i.e., the mode is required to be returned (from the low power consumption mode) to the regular mode at a higher speed. At the point of time when the data management information 201 can be restored on the DRAM 20, the storage device 1 becomes able to handle any request other than a read request regarding the user data 202 in the cache data 200, and notify the host device 2 of completion of returning the mode to the regular mode.

Furthermore, which data of the cache data 2 should be saved in the NAND memory 30 and which data of the cache data 2 should be in the host device 2 may be determined in accordance with the kind of the data. Alternatively, it may be determined based on, for example, the free space for storage of the NAND memory 30 or the degree of degradation thereof, or the importance of the data.

It should be noted that in particular, in the case where the cache data 200 is dividedly saved in the DRAM 52 of the host device and the NAND memory 30, it is preferable that the data save controller 110 notify the host device 2 of completion of saving of the cache data 200. In addition, in the case where the cache data 200 is saved only in the DRAM 52 of the host device 2, the controller 10 may be configured to stop the supply of power to the NAND memory 30 without awaiting for completion of saving of the cache data 200.

As described above, by applying the storage device 1 according to the embodiment, it is possible to take a countermeasure considering how data should be easily saved and restored.

To be more specific, the storage device 1 according to the embodiment can restrict the degradation of the NAND memory 30, improve the reliability of saving of data, and reduce the time required to change the mode between the regular mode and the low power consumption mode.

The various functions referred to with respect to the embodiment may be achieved by a processing circuit. As an example of the processing circuit, a programmed processor such as a central processing unit (CPU) is also present. The processor executes each of the above functions by carrying out a program written in a memory. As the processor, a microprocessor including an electronic circuit may be applied. As examples of the processing circuit, a digital signal processor (DSP), an application specific integrated circuit (ASIC), a microcontroller, a controller, and other electric circuit components are present.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a first nonvolatile memory;
a second volatile memory in which at least one of management information and user data is temporarily stored as cache data, the management information being information for managing user data written in the first nonvolatile memory; and
a controller configured to execute processing for writing the cache data stored in the second volatile memory to a third memory of a host device, when the storage device is changed from a normal mode to a low power consumption mode in which supplying of power to the second volatile memory is stopped, in response to a request from the host device,
wherein the controller is configured to:
in a case that the storage device is expected to be in the low power consumption mode longer than a first time period, write the management information to the third memory of the host device and write the user data to the first nonvolatile memory, and
in a case that the storage device is expected to return to the normal mode from the low power consumption mode in a second time period,
write the management information to the first nonvolatile memory and write the user data to the third memory of the host device.

2. The storage device of claim 1, wherein the controller is configured to set one of the first nonvolatile memory and the third memory of the host device as a target memory for writing the cache data stored in the second volatile memory.

3. The storage device of claim 1, wherein the controller is further configured to transmit the cache data stored in the second volatile memory to the host device as write data to the third memory, without adding an error-correcting code or an error detection code for data protection to the cache data.

4. The storage device of claim 1, wherein the controller is configured to compress the cache data stored in the second volatile memory, and to transmit the compressed cache data to the host device as write data to the third memory.

5. The storage device of claim 4, wherein the controller is configured to compress the cache data if a size of the cache data is greater than or equal to a threshold value.

6. The storage device of claim 1, wherein the controller is configured to encrypt the cache data stored in the second volatile memory, and to transmit the encrypted cache data to the host device as write data to the third memory.

7. The storage device of claim 1, wherein
the cache data includes first cache data and second cache data, and
the first cache data includes the user data, and
the second cache data includes the management information.

8. The storage device of claim 1, wherein the controller is further configured to execute processing for reading the cache data from the third memory of the host device and writing the read cache data to the second volatile memory, when the storage device is returned from the low power consumption mode to the normal mode.

9. The storage device of claim 1, wherein the controller is configured to set one of two or more memories in the host device as the third memory.

10. The storage device of claim 1, wherein the controller is thither configured to select one of the first nonvolatile memory and the third memory of the host device as a target memory for writing the cache data, based on a size of the cache data.

11. The storage device of claim 1, wherein the controller is configured to transmit data items of the cache data to host device or write the data items of the cache data to the first nonvolatile memory, in descending order of importance of data item.

12. The storage device of claim 1, wherein the cache data includes first cache data and second cache data, and the controller is further configured to notify the host device of completion of saving of the cache data, when the first cache data is completely transmitted to the host device or the second cache data is completely written to the first nonvolatile memory.

13. The storage device of claim 1, wherein the controller is further configured to determine a target memory for writing the cache data from one of the first nonvolatile memory and the third memory of the host device, in accordance with a degree of degradation of the first nonvolatile memory.

14. The storage device of claim 13, wherein the controller is further configured to decrease an amount of data protection by an error-correcting code for data items of the cache data in transitioning to the low power consumption mode in accordance with a degree of degradation of the first nonvolatile memory.

15. The storage device of claim 1, wherein the controller is further configured to notify the host device of completion of returning to the normal mode from the low power consumption mode, when the management information is restored on the second volatile memory.

16. A data saving method for a storage device which includes a first nonvolatile memory and a second volatile memory in which at least one of management information and user data is temporarily stored as cache data, the management information being information for managing the user data written in the first nonvolatile memory, and which is connected to a host device including a third memory, the method comprising:
executing processing for writing the cache data stored in the second volatile memory to the third memory of the host device, when the storage device is changed from a normal mode to a low power consumption mode in which supplying of power to the second volatile memory is stopped, in response to a request from the host device,
wherein the executing the processing comprises:
in a case that the storage device is expected to be in the low power consumption mode longer than a first time period, writing the management information to the third memory of the host device and writing the user data to the first nonvolatile memory, and
in a case that the storage device is expected to return to the normal mode from the low power consumption mode in a second time period, writing the management information to the first nonvolatile memory and writing the user data to the third memory of the host device.

* * * * *